Patented Sept. 6, 1938

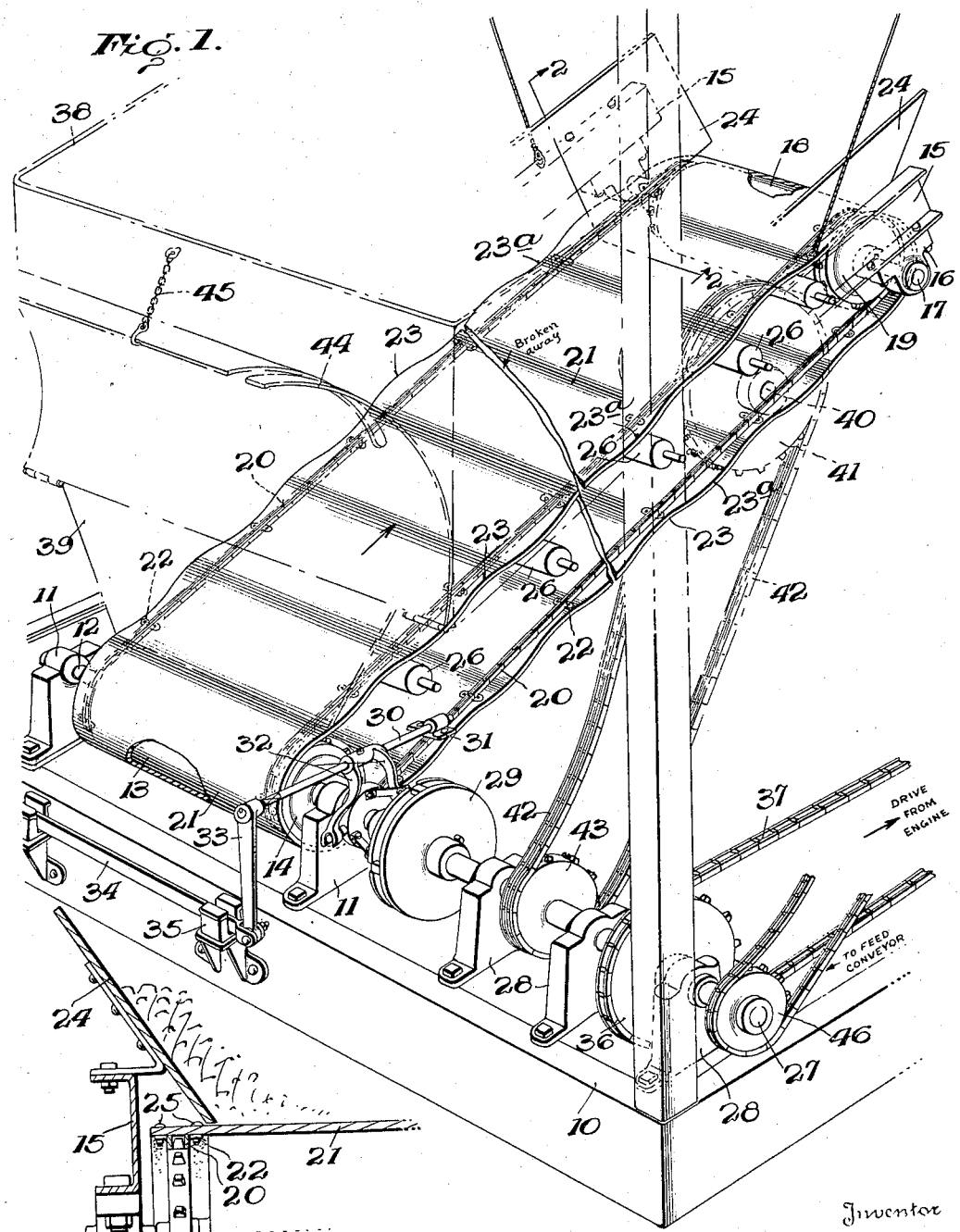

2,129,337

UNITED STATES PATENT OFFICE 2,129,337

CONVEYER

Joseph MacKay Spears, Washington, D. C.

Application October 22, 1937, Serial No. 170,496

4 Claims. (Cl. 198—194)

This invention relates to apparatus for the production of bituminous mastics such as are used in the formation of roadways and the like.

More particularly the invention relates to a conveyer for the mastic in its freshly made state.

In the making of mastics of the type mentioned, it is usual to provide an aggregate of crushed or broken stone or other similar material which is mixed in weighed proportions with asphalt, both aggregate and asphalt being heated so that the asphalt will uniformly flow over the surfaces of the aggregate and be uniformly disposed between aggregate particles. This mixing is frequently performed in a pugging mill from which the mastic is delivered in its mixed state for transportation to the site of the construction in which it is to be used. This transportation is commonly effected by means of wheeled vehicles which are most conveniently loaded by a conveyer receiving the mastic from the pugging mill. In other cases the entire transportation may be effected by a conveyer. When delivered from the pugging mill the mastic is in an extremely sticky condition. It is therefore impractical to use a bucket conveyer for such material as the buckets quickly become clogged by masses of the mixture. Also it is impractical to use flight conveyers having a belt across which flight strips are secured at intervals because the mixture quickly collects in the angles between the forward faces of the flights and the surface of the belt. Nevertheless, it is found advisable to provide a conveyer having some form of pocketing especially when the conveyer inclines upwardly from its receiving end to its delivery end.

It is an important object of the present invention to provide a novel conveyer especially adapted for the conveyance of bituminous mastics and other sticky material wherein all clogging of the conveyer by the adhesion of the conveyed material will be eliminated.

A second important object of the invention is the provisions of a conveyer having a novel arrangement of pocket means for the material being conveyed.

A third important object of the invention is to provide a novel arrangement of belt conveyer employing a continuous and uniformly flexible belt and means to support and drive the same, the whole being so constructed and arranged that the belt is caused to form successive pockets between the receiving and discharging ends of the conveyer.

A fourth important object of the invention is to provide, in such a belt conveyer, means at the delivery end whereby the pocketing formed between the conveyer ends is eliminated.

With the above and other objects in view, the invention consists in general of certain novel details of construction and combinations of parts hereinafter fully described, illustrated in the accompanying drawing, and pointed out particularly in the appended claims.

In the drawing, like characters of reference indicate like parts in the several views, and Figure 1 is a fragmentary perspective view of a portion of an apparatus for mixing the stone and asphalt to produce the mastic, and disclosing the improved conveyer forming the present invention, Figure 2 is a fragmentary cross-section through the conveyer adjacent one end thereof.

In the embodiment of the invention as here disclosed the apparatus is shown as of the portable type, being mounted on a car floor 10. On the floor 10, which forms the base or foundation of the apparatus, is mounted a pair of bearing pedestals 11 the bearings whereof are lined to receive the rotatable driving shaft 12. On this shaft is mounted a drum or cylinder 13 and on the shaft 12 closely adjacent each end of the cylinder 13 is a sprocket wheel 14. On the floor or base 10 is supported a frame two elevated parallel members of which are shown at 15 as ordinary channel irons. The frame members 15 carry depending alined bearings 16 wherein is journalled a driven shaft 17. On the shaft 17 is fixed a drum or cylinder 18 having adjacent each end a sprocket wheel 19. The shafts 12 and 17 are parallel and the sprockets 14 and 19 are in edgewise alinement. The pitch diameters of the sprocket wheels 14 and 19 are considerably less than the diameters of the drums or cylinders 13 and 18. Sprocket chains 20 are trained around the pairs of sprockets 14 and 19 and trained over the cylinders 13 and 18 is a continuous belt 21 of suitable flexible material and of greater length than the chains 20. Furthermore the belt 21 is of greater width than the lengths of the drums so that the edges of the belt overhang the sprockets and chains. At spaced intervals the chains 20 are provided with links having attaching lugs 22 and the distance to which these lugs project radially is such that, as the lug provided links pass around the sprockets the radial distance from the sprocket axis to the outer face of the lug equals the radius of the cylinder or drum so that the overhanging edges of the belt rest on these outer faces of the lugs. These overhanging edges are riveted or otherwise fixed to the lugs 22 at points which are equally spaced longitudinally of the belt.

By reason of the fact that the belt 21 is longer than the chains 20, those portions of the belt between the lugs 22 are of greater length than the corresponding portions of the chains, as a result of which said portions of the belt will buckle and form a series of riffles 23 between the drums 13 and 18, having pockets 23a therebetween. The length of the belt taken up by each riffle is only such, however, that it will be tensed in passing around the drums, causing the riffles with their intervening pockets to disappear for the time, the drum at each end absorbing the slack and the belt moving in smooth cylindrical arcs around the drums. To assure this condition, it is well to perform the work of attaching the lugs to the belt where the latter is encircling either of the drums 13 and 18. The pocket formation will assist in the conveyance of the material and, as the belt moves around the cylinder 18, the tensing of the belt and its bending around the cylinder serves to free the belt from any material which may tend to adhere thereto.

In order to prevent the material from falling off the belt at the sides thereof, there is provided a pair of side boards 24 which extend along the upper run of the belt, adjacent each side thereof, and are inclined downwardly toward each other so that their lower edges lie closer to the longitudinal center of the belt than the rivets 25 which secure the lugs 22 to the belt. Idle rolls 26 are suitably supported beneath the upper runs of the chains 20 to carry the load on the conveyer between the drums.

In order to drive the conveyer there is provided a jack shaft 27 which is supported in alinement with the shaft 12 by pedestal bearings 28 mounted on the floor or base 10. A suitable clutch 29 has its clutch elements arranged on the adjacent ends of the shafts 12 and 27. A slipper shaft 30 is journalled in bearings 31 and is provided with slipper arms 32 arranged to engage or disengage the clutch members as the shaft 30 is rocked in one direction or the other. A rocker arm 33 is fixed on this shaft 30 to rock the shaft and a link or rod 34 is connected to this arm and leads off to an operator's station through guides 35.

The shaft 27 is provided with a sprocket wheel 36 driven by a chain 37 from some suitable source of power as an engine or motor. A portion of a pugging mill is indicated at 38 and this mill is provided with a chute 39 opening over the receiving end of the conveyer so that mixed material or mastic is delivered directly from the mill to the conveyer. The mill shaft is shown at 40 and carries a sprocket wheel 41 which is connected by chain 42 with a sprocket wheel 43 fixed on the shaft 27. A cover plate 44 is hinged to the mill 38 and may be held raised, as shown, by a chain 45 or may be lowered to cover the lower parts of the conveyer. Other sprocket wheels and chains, as indicated generally at 46, may be used to drive the other elements of the asphalt mixer from the shaft 27. In use, the clutch 29 is manipulated so that the drum 13 is rotated. The conveyer will then move to form the series of alternate riffles 23 and pockets 23a in the belt 21 which then carries the mastic from the chute 39 of the mill 38 to the delivery end of the conveyer where it is delivered to a truck or other suitable receptacle.

What is claimed is:

1. In a belt conveyer, an endless load supporting belt, a pair of endless sprocket chains adjacent and parallel to the edges of the belt, said chains having lug provided links at uniformly spaced intervals and being shorter than the belt, the lugs of the two chains being connected to opposite points of the edge portions of the belt at evenly spaced intervals along said edges, a pair of parallel drums around which said belt is trained, and sprocket wheels co-axial with said drums and having said chains tensely trained therearound, said drums being of such relatively greater diameter than the sprockets as to effect smoothing of the belt to concentricity with the drums in passing thereover, the marginal portions of said belt overlapping the ends of the drums and the chains being located between the runs of the belt.

2. In a belt conveyer, an endless load supporting belt, a pair of endless sprocket chains adjacent and parallel to the edges of the belt, said chains having lug provided links at uniformly spaced intervals and being shorter than the belt, the lugs of the two chains being connected to opposite points of the edge portions of the belt at evenly spaced intervals along said edges, a pair of parallel drums around which said belt is trained, sprocket wheels co-axial with said drums and having said chains tensely trained therearound, and side boards extending along the upper run of said belt and having their lower edges guarding the lug connections from contact with the load on the belt.

3. In a belt conveyer, an endless load supporting belt, a pair of endless sprocket chains adjacent and parallel to the edges of the belt, said chains having lug provided links at uniformly spaced intervals and being shorter than the belt, the lugs of the two chains being connected to opposite points of the edge portions of the belt at evenly spaced intervals along said edges, a pair of parallel drums around which said belt is trained, sprocket wheels co-axial with said drums and having said chains tensely trained therearound, said drums being of such relatively greater diameter than the sprockets as to effect smoothing of the belt to concentricity with the drums in passing thereover, and side boards extending along the upper run of said belt and having their lower edges guarding the lug connections from contact with the load on the belt.

4. In a belt conveyer, an endless load supporting belt, a pair of endless sprocket chains adjacent and parallel to the edges of the belt, said chains having lug provided links at uniformly spaced intervals and being shorter than the belt, the lugs of the two chains being connected to opposite points of the edge portions of the belt at evenly spaced intervals along said edges, a pair of parallel drums around which said belt is trained, sprocket wheels co-axial with said drums and having said chains tensely trained therearound, said drums being of such relatively greater diameter than the sprockets as to effect smoothing of the belt to concentricity with the drums in passing thereover, and side boards extending along the upper run of said belt and having their lower edges guarding the lug connections from contact with the load on the belt.

JOSEPH MacKAY SPEARS.